(12) United States Patent
Murai

(10) Patent No.: US 7,016,611 B2
(45) Date of Patent: Mar. 21, 2006

(54) OPTICAL COMMUNICATIONS APPARATUS AND OPTICAL COMMUNICATIONS SYSTEM

(75) Inventor: Hitoshi Murai, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 643 days.

(21) Appl. No.: 10/098,370

(22) Filed: Mar. 18, 2002

(65) Prior Publication Data

US 2002/0141016 A1   Oct. 3, 2002

(30) Foreign Application Priority Data

Mar. 30, 2001 (JP) .............................. 2001-100568

(51) Int. Cl.
*H04J 14/08* (2006.01)
(52) U.S. Cl. ..................... 398/98; 398/51; 398/54; 398/79
(58) Field of Classification Search ............ 398/49–64, 398/79, 165–167, 98–103
See application file for complete search history.

(56) References Cited

U.S. PATENT DOCUMENTS

| | | | | |
|---|---|---|---|---|
| 5,737,460 A | * | 4/1998 | Damen et al. ................. | 385/24 |
| 5,907,421 A | * | 5/1999 | Warren et al. ............... | 398/188 |
| 5,926,297 A | * | 7/1999 | Ishikawa et al. .............. | 398/43 |
| 6,091,864 A | * | 7/2000 | Hofmeister ..................... | 385/2 |
| 6,763,197 B1 | * | 7/2004 | Hirano et al. ............... | 398/192 |

OTHER PUBLICATIONS

T.Yu et al.; "Dispersion-managed soliton interactions in optical fibers"; Optics Letters, vol. 22, No. 11, date published: Jun. 1, 1997.

* cited by examiner

*Primary Examiner*—Jason Chan
(74) *Attorney, Agent, or Firm*—Venable, LLP; James R. Burdett

(57) ABSTRACT

An optical communications apparatus that is superior in terms of the quality of long-distance transmission. The optical communications apparatus has a plurality of time-division multiplexing devices and an optical multiplexer. Each of time-division multiplexing devices generates optical data sequences by subjecting two systems of optical signal sequences to time-division multiplexing. In each optical data sequence, the duty ratio of the optical pulses is 0.5 or greater, and the phase difference between adjacent optical pulses is $\pi$ phase. Moreover, the optical multiplexer subjects the optical data sequences input from the plurality of transmitters to wavelength-division multiplexing. Since the duty ratio is set at 0.5 or greater and the phase difference is set at $\pi$ phase, the soliton interaction of the optical signal sequences and the interaction between channels can be reduced, so that the reliability of the transmitted data is improved.

9 Claims, 10 Drawing Sheets

OPTICAL COMMUNICATIONS APPARATUS AND OPTICAL COMMUNICATIONS SYSTEM

BACKGROUND OF THE INVENTION

1. Field of the Invention

The present invention relates to a optical communications apparatus and optical communications system which are used to generate sequences of optical signals. For example, the present invention is used in optical communications networks using an RZ (return to zero) transmission system.

2. Description of Related Art

Conventionally, a system using optical solitons as pulse signal light has been known as one type of optical communications system based on RZ transmission. The term "optical solitons" refers to stable optical pulses that are propagated through optical fibers in a state in which the spread of these optical pulses is suppressed by a self phase modulation effect.

Furthermore, the dispersion-managed soliton transmission system is known as one type of RZ transmission system using optical solitons. By using this dispersion-managed soliton transmission system, it is possible to reduce the rate of signal error generation in long-distance transmission by further suppressing waveform distortion of the optical solitons. For example, this dispersion-managed soliton transmission technique is disclosed in the following reference:

"Dispersion-manage soliton interactions in optical fibers", T. Yu et al., OPTICS LETTERS, Vol. 22, No. 11, p. 793, 1997.

In dispersion-managed soliton transmission, a transmission path is constructed by combining a plurality of different types of optical fibers with different optical characteristics; furthermore, pulse signal light with an appropriate light intensity and pre-chirp is used. Dispersion-managed soliton transmission makes it possible to balance the wavelength dispersion and nonlinear effects of the optical fibers; accordingly, waveform distortion of the pulse signal light can be suppressed.

The simplest dispersion-managed soliton transmission path is constructed from a fiber that has a positive wavelength dispersion (anomalous-dispersion fiber) and a fiber that has a negative wavelength dispersion (normal-dispersion fiber) (see the abovementioned reference, p. 793, line 12 to line 17). Specifically, this dispersion-managed soliton transmission path compensates for the wavelength dispersion of the transmission path by combining an anomalous-dispersion fiber and a normal-dispersion fiber.

One of the causes of degradation of dispersion-managed soliton transmission is nonlinear interaction between pulses (i. e., soliton interaction). This soliton interaction consists of attractive and repulsive forces that act between the optical pulses (i. e., optical solitons) that are propagated through the optical fibers. When such soliton interaction acts on the optical solitons, a time shift (time jitter) is generated between adjacent optical solitons. Furthermore, in cases where this soliton interaction is extremely large, the adjacent solitons collide with each other. This distance from the starting point of transmission to the point of collision is called the collision distance or interaction length, and is an important indicator that expresses the properties of optical solitons. The collision distance depends on the dispersion management intensity, optical pulse waveform and the like.

The dispersion management intensity is also called the map intensity, and is generally expressed as a parameter $\gamma$ (see FIG. 1 in the abovementioned reference). This parameter $\gamma$ varies according to the types of fibers that make up the dispersion-managed soliton transmission path. As is shown in FIG. 3 of the abovementioned reference, the collision distance reaches a maximum length when this parameter $\gamma$ is approximately 3.3.

Furthermore, as is shown in FIG. 3 of the abovementioned reference, the collision distance increases with an increase in the ratio $\tau S/\tau 0$ of the pulse interval $\tau S$ to the pulse width (half-value width) $\tau 0$ of the optical pulses formed by the optical solitons (i. e., with a decrease in the pulse width $\tau 0$).

Accordingly, by setting the map intensity parameter $\gamma$ at 3.3 and setting $\tau S/\tau 0$ at as large a value as possible, it is possible to reduce the effects of soliton interaction so that good dispersion-managed soliton transmission over a long distance becomes possible.

In single-channel dispersion-managed soliton transmission, the quality of long-distance transmission can be improved by reducing the effects of soliton interaction as described above.

However, in the case of fine wavelength-division multiplex dispersion-managed soliton transmission, nonlinear interaction between channels, i. e., cross phase modulation (XPM), appears to a conspicuous degree in addition to nonlinear interaction between pulses, i. e., soliton interaction.

In the case of fine wavelength-division multiplex transmission, the wavelength varies from channel to channel; accordingly, the optical solitons of different channels collide with each other and pass each other during propagation through the optical fibers. In the case of such collisions, the optical solitons act as perturbations with respect to the other optical solitons. This action is cross phase modulation. Cross phase modulation causes the center frequencies of the signals formed by the optical solitons to be displaced, and causes waveform distortion of the optical solitons.

The signals formed by the optical solitons have various code patterns according to the information being transmitted. Accordingly, when optical solitons collide with a plurality of optical solitons of different channels during propagation through the optical fibers, various frequency variations and waveform distortions of the optical solitons result. These frequency variations and waveform distortions cause the generation of time jitter and intensity jitter.

Cross phase modulation reduces as the ratio $\Delta\omega/\omega 0$ of the frequency interval $\Delta\omega$ of the adjacent channels to the width $\omega 0$ of the frequency spectrum of the optical signals increases. Accordingly, in a case where the frequency interval $\Delta\omega$ is fixed, the effects of cross phase modulation diminish with a decrease in the width $\omega 0$ of the frequency spectrum. However, when the width $\omega 0$ of the frequency spectrum is decreased, the pulse width $\tau 0$ of the optical pulses increased. As was described above the collision distance between optical solitons within the same channel becomes shorter as the ratio $\tau S/\tau 0$ of the pulse interval $\tau S$ to the pulse width $\tau 0$ decreases; accordingly, the quality of long-distance transmission is lost.

SUMMARY OF THE INVENTION

An object of the present invention is to provide an optical communication technology which is superior in terms of the quality of long-distance transmission.

The optical communications apparatus according to the present invention comprises a time-division multiplexing device which generates optical data sequences in which the phase difference between adjacent optical pulses is $\pi$ phase, by subjecting a first optical signal sequence in which the duty ratio of the respective optical pulses is 0.5 or greater and a second optical signal sequence in which the duty ratio of the respective optical pulses is 0.5 or greater to time-division multiplexing.

Moreover, the optical communications system according to the present invention comprises; the transmission side optical communications apparatus comprising a transmitter that generate optical data sequences in which the phase difference between adjacent optical pulses is $\pi$ phase, by subjecting a first optical signal sequence in which the duty ratio of the respective optical pulses is 0.5 or greater and a second optical signal sequence in which the duty ratio of the respective optical pulses is 0.5 or greater to time-division multiplexing; an optical communications line which transmits the multiplexed optical data sequence transmitted from the transmission side optical communications device; and a reception side optical communications apparatus which decodes the optical data sequence received from the optical communications line to the first and second optical signal sequences.

According to the present invention, optical signal sequences consisting of optical pulses with a duty ratio of 0.5 or greater and a phase difference of $\pi$ phase are used in communications; accordingly, the quality of long-distance transmission can be improved.

BRIEF DESCRIPTION OF THE DRAWINGS

Other objects and advantages of the present invention will be described below with reference to the following attached figures.

DESCRIPTION OF THE PREFERRED EMBODIMENTS

An embodiment of the present invention will be described below with reference to the attached figures. In the figures, the sizes, shapes and installation relationships of the respective constituent components are shown only in approximate terms, to an extent that allows understanding of the present invention. Furthermore, the conditions expressed in numerical values below are merely examples.

Figure 1:
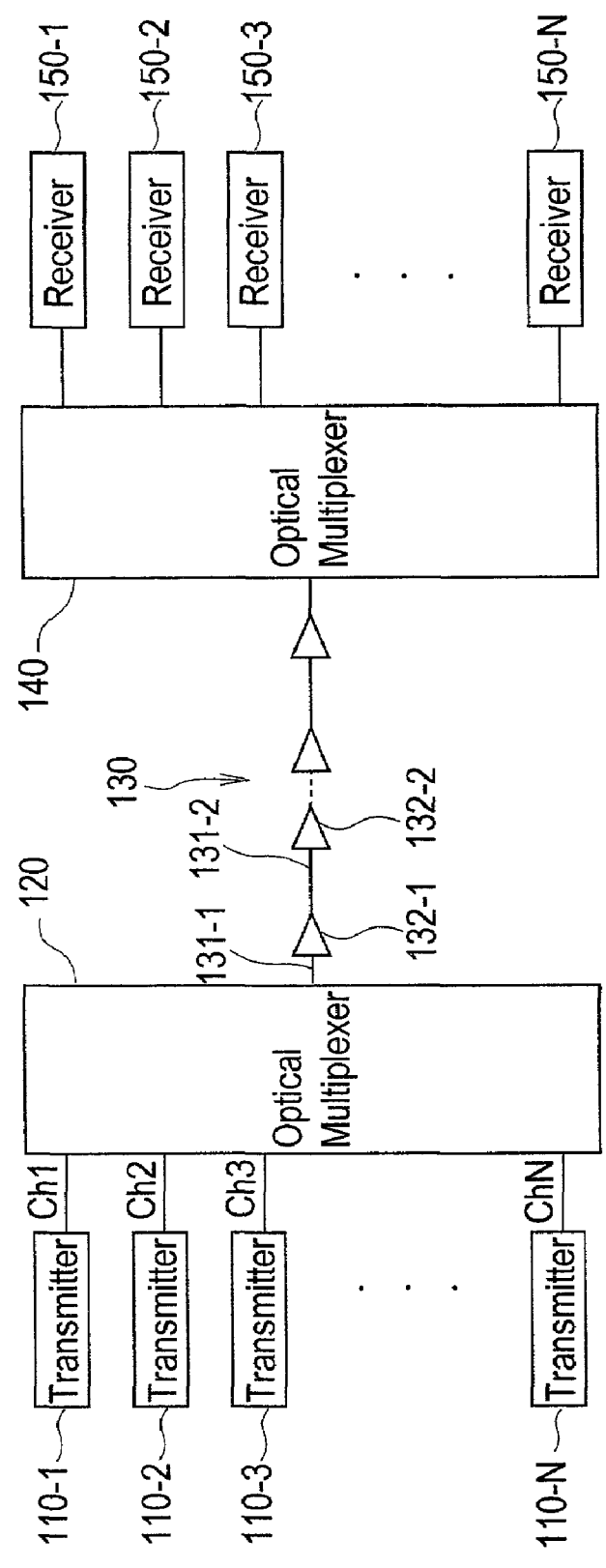
FIG. 1 is a schematic diagram which shows the overall construction of a wavelength-division multiplex transmission system constituting an embodiment of the present invention.

FIG. 1 is a schematic diagram which shows the overall construction of the wavelength-division multiplex system of this embodiment.

As is shown in FIG. 1, this system comprises N transmitters 110-1, 110-2, . . . , 110-N, an optical multiplexer 120, an optical communications line 130, an optical demultiplexer 140, and N receivers 150-1, 150-2, . . . , 150-N.

The transmitters 110-1 to 110-N respectively generate optical data sequences corresponding to communications channels ch1 to chN. Mutually different frequencies are assigned at equal intervals to the respective communications channels ch1 to chN. As will be described later, the optical data sequences corresponding to the respective communications channels ch1 to chN are obtained by time-division multiplexing two systems of optical signal sequences (see FIG. 2).

The optical multiplexer 120 inputs optical data sequences corresponding to the communications channels ch1 to chN from the transmitters 110-1 to 110-N, and subjects these optical data sequences to wavelength-division multiplexing. The wavelength-division multiplexing method used is the same as in a conventional technique.

The optical communications line 130 propagates the optical data output by the optical multiplexer 120. This optical communications line 130 comprises a plurality of optical fibers, 131-1, 131-2, . . . , and a plurality of optical amplifiers 132-1, 132-2, . . . . As will be described later, the structure of the optical communications line 130 is the same as the structure of a conventional dispersion-managed soliton transmission path (see FIG. 5). Furthermore, the total length of the optical communications line 130 is (for example) several thousand kilometers.

The optical demultiplexer 140 receives the optical data received from the optical communications line 130, separates this data into the optical signal sequences of the respective communications channels ch1 to chN, and outputs these optical signal sequences. The method of separation used is the same as that used for separation in a common wavelength-division multiplexing technique.

The receivers 150-1 to 150-N respectively receive the optical data sequences of the corresponding communications channels. Furthermore, each of the receivers 150-1 to 150-N separates the received signal sequences into two systems of optical signal sequences. The method of separation used is the same as that used for separation in a common time-division multiplexing technique.

Figure 2:
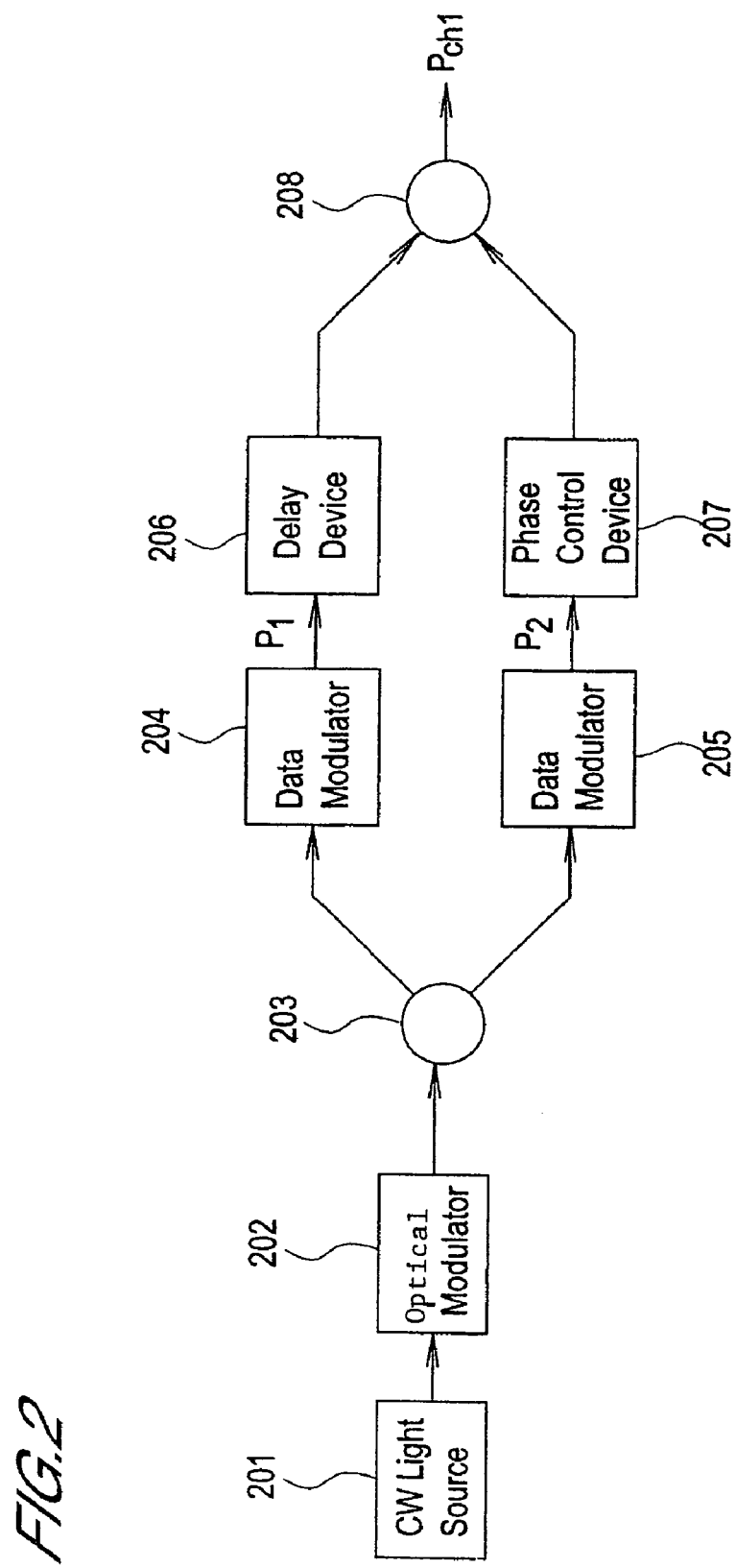
FIG. 2 is a schematic diagram which shows the main parts of the internal construction of one of the transmitters shown in FIG. 1.

FIG. 2 is a schematic diagram which shows the main parts of the internal construction of the transmitter 110-1.

As is shown in FIG. 2, the transmitter 110-1 is equipped with a CW (continuous wave) light source 201, an optical modulator 202, an optical branching circuit 203, data modulators 204 and 205, a delay device 206, a phase control device 207, and an optical multiplexing circuit 208.

Figure 3A:
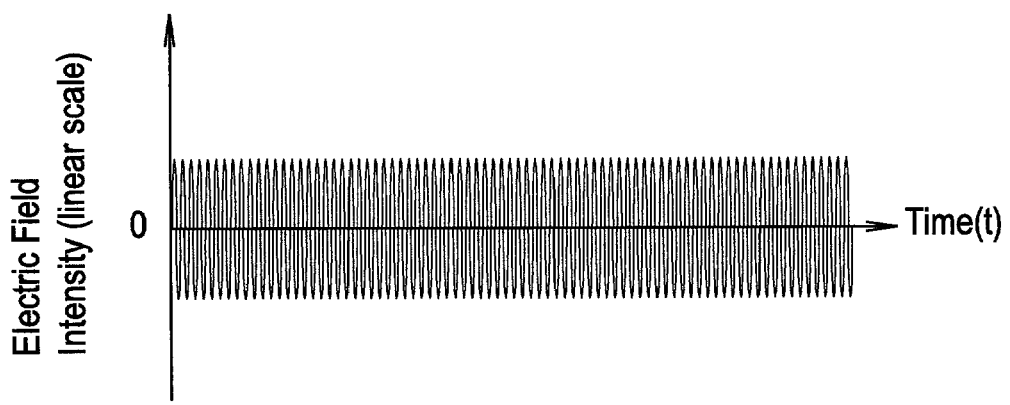
FIG. 3A is a waveform diagram of the CW light in the wavelength-division multiplex system of the embodiment.

The CW light source 201 generates and outputs high-frequency CW light. The waveform of this CW light is shown in schematic terms in FIG. 3A. In FIG. 3A, the vertical axis indicates the electric field intensity on a linear scale, and the horizontal axis indicates time.

Figure 3B:
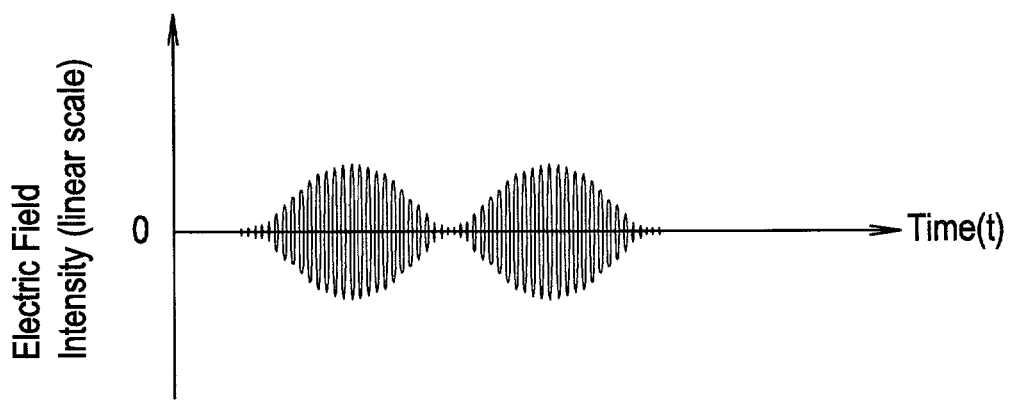
FIG. 3B is a waveform diagram of the Gauss-modulated light in the wavelength-division multiplex system of the embodiment.
Figure 3C:
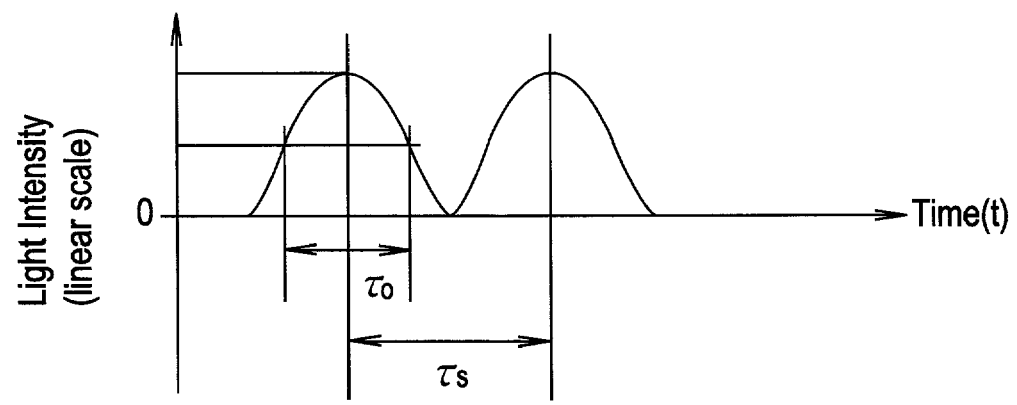
FIG. 3C is a light intensity waveform diagram of the Gauss-modulated light shown in FIG. 3B.

The optical modulator 202 generates Gauss-modulated light of the type shown in FIG. 3B by modulating the amplitude (intensity) or the like of the CW light that is input from the CW light source 201. In FIG. 3B, the vertical axis indicates the electric field intensity on a linear scale, and the horizontal axis indicates time. FIG. 3C shows the light intensity waveform of the Gauss-modulated light shown in FIG. 3B. In FIG. 3C, the vertical axis indicates the light intensity on a linear scale, and the horizontal axis indicates time. In this way, an optical short pulse sequence consisting of continuous Gauss-modulated light is generated. Here, as is shown in FIG. 3C, the optical modulator 202 generates an optical short pulse sequence so that the ratio $\tau 0/\tau S$ of the pulse width (half-value width) $\tau 0$ of the optical pulses to the pulse interval $\tau S$ is 0.5 or greater, i.e., so that the duty ratio (the pulse width normalized by the initial pulse interval) $\tau 0$ is 0.5 or greater. For example, an EA (electroabsorption optical) modulator can be used as the optical modulator 202.

The optical branching circuit 203 splits this optical short pulse sequence into two branches, and sends the respective optical short pulse sequences to the data modulators 204 and 205. For example, the optical branching circuit 203 can be constructed by splitting an optical waveguide into two branches.

The data modulator 204 subjects the optical short pulse sequence input from the optical branching circuit 203 to data modulation (encoding), thus generating an optical signal sequence P1 corresponding to the desired data. Similarly, the data modulator 205 subjects the optical pulse sequence input from the optical branching circuit 203 to data modulation, thus generating an optical signal sequence P2 corresponding to the desired data.

Figure 4A:
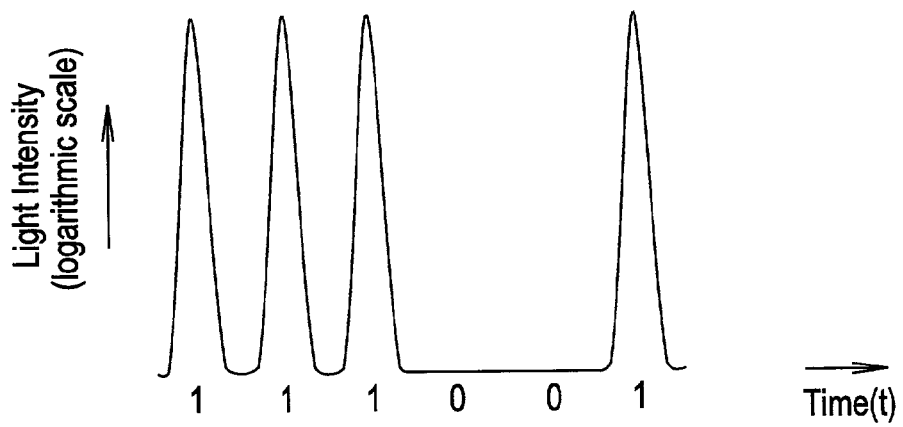
FIG. 4A is a waveform diagram of the optical signal sequence output from the delay device of the wavelength-division multiplex system of the embodiment.
Figure 4B:
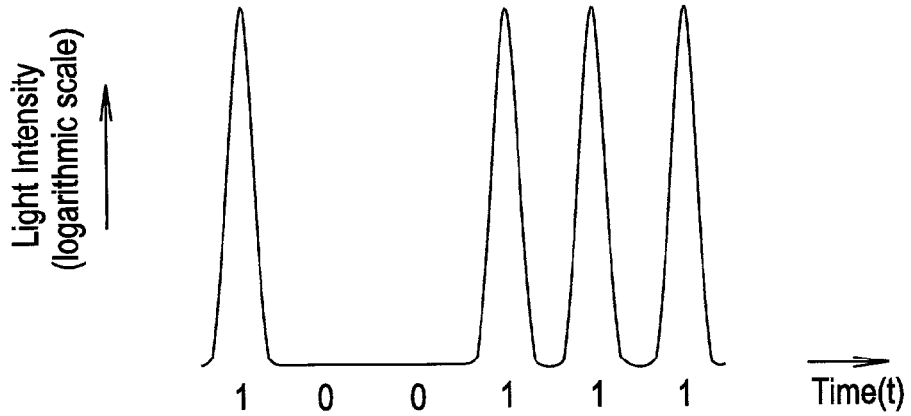
FIG. 4B is a waveform diagram of the optical signal sequence output from the phase control device of the wavelength-division multiplex system of the embodiment.

The delay device 206 delays the optical signal sequence P1 input from the data modulator 204, so that the waveform of this optical signal sequence is adjusted. The phase control device 207 shifts the phase of the optical signal sequence P2 input from the data modulator 205 by $\pi$ phase with respect to the signal sequence output from the delay device 206. FIG. 4A shows one example of the optical signal sequence P1 that is output from the delay device 206, and FIG. 4B shows one example of the optical signal sequence P2 that is output from the phase control device 207. In FIGS. 4A and 4B, the vertical axis indicates the light intensity on a logarithmic scale, and the horizontal axis indicates time. As is seen from these figures, two systems of optical signal sequences P1 and P2 whose phases are shifted by $\pi$ phase relative to each other can be obtained by means of the delay device 206 and phase control device 207.

Figure 4C:
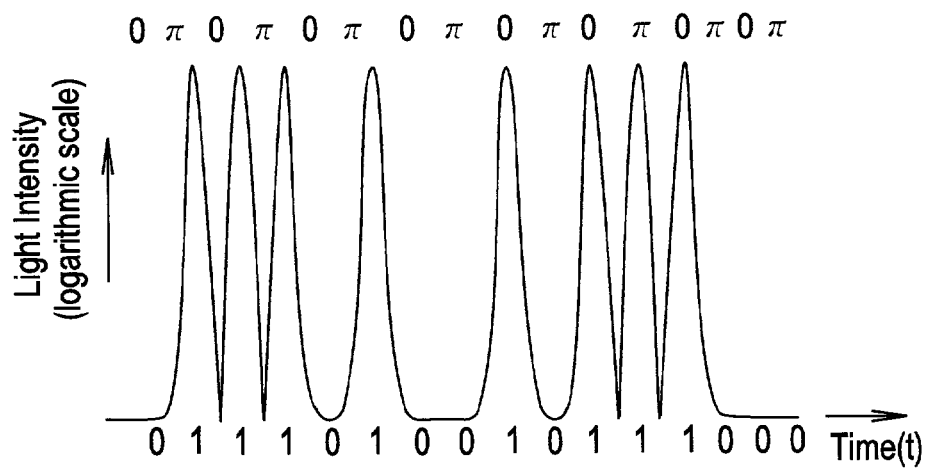
FIG. 4C is a waveform diagram of the optical signal sequence output from the optical multiplexing circuit of the wavelength-division multiplex system of the embodiment.

The optical multiplexing circuit 208 multiplexes the optical signal sequence P1 that is input from the delay device 206 and the optical signal sequence P2 that is input from the phase control device 207. FIG. 4C is a schematic diagram which shows the signal waveform of the optical data sequence Pchl that is output from the optical multiplexing circuit 208. In FIG. 4C, the vertical axis indicates the light intensity on a logarithmic scale, and the horizontal axis indicates time. As is shown in FIG. 4c, the two systems of optical signal sequences P1 and P2 are time-division multiplexed by this multiplexing circuit 208. In the optical signal sequence Pchl, as was described above, the $\tau 0/\tau S$ ratio of the respective optical pulses is 0.5 or greater, and the phase difference between adjacent optical pulses is $\pi$ phase. For example, the optical multiplexing circuit 208 can be constructed by an optical waveguide.

Furthermore, the internal constructions of the transmitters 110-2 to 110-N are the same as the internal construction of the transmitter 110-1 shown in FIG. 2.

Figure 5A:
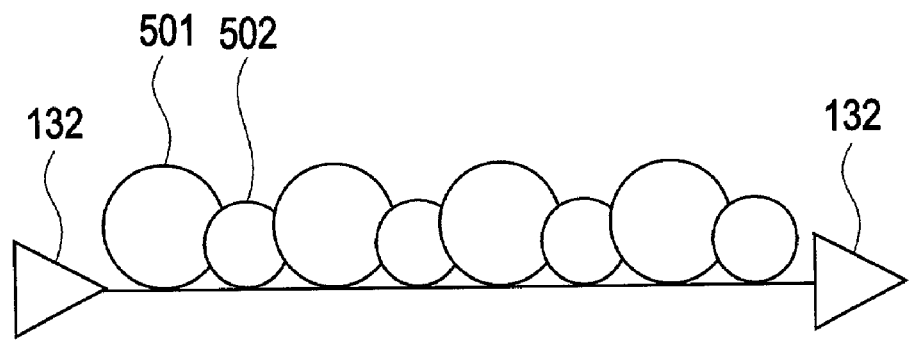
FIGS. 5A and 5B are schematic diagrams used to illustrate in detail the structure of the optical communications circuit shown in FIG. 1.
Figure 5B:
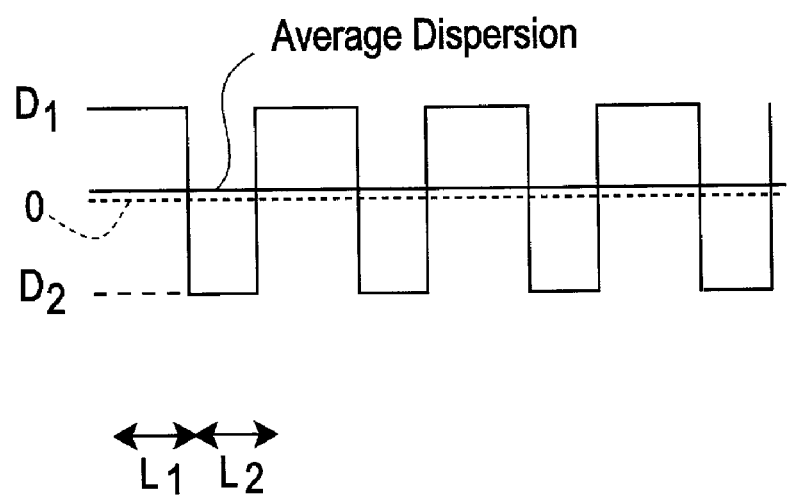

FIGS. 5A and 5B are schematic diagrams that are used to illustrate the structure of the optical communications line 130.

As is shown in FIG. 5A, the optical fibers 131-1, 131-2, . . . of the optical communications line 130 are respectively constructed by alternately connecting dispersion fibers 501 and 502 of two different types. Furthermore, as is shown in FIG. 5B, the dispersion fibers 501 are dispersion fibers whose wavelength dispersion D1 has a positive value (i.e., anomalous-dispersion fibers), while the dispersion fibers 502 are dispersion fibers whose wavelength dispersion D2 has a negative value (i.e., normal-dispersion fibers). Here, the length of the anomalous-dispersion fibers 501 is L1, while the length of the normal-dispersion fibers 502 is L2. The lengths L1 and L2 may be set in accordance with the magnitudes D1 and D2 of wavelength dispersion so that the wavelength dispersion of the transmission path as a mean value has the desired value, i.e., an anomalous dispersion value that allows the propagation of solitons.

Next, the principle of the wavelength-division multiplex transmission system of the present embodiment will be described.

In the system of the present embodiment, as was described above, optical data sequences in which the duty ratio (i.e., the pulse width normalized by the initial pulse interval) $\tau 0$ of the respective optical pulses is 0.5 or greater and the phase difference between adjacent optical pulses is $\pi$ phase are used as the optical data sequences of the respective channels. As a result, data sequences that are superior in terms of propagation characteristics can be obtained. The reason for this will be described below.

As was described above, soliton interaction acts between optical solitons of the same wavelength, and this causes the waveform of the optical solitons to deteriorate. Soliton interaction is a perturbation that causes overlapping between adjacent solitons of the same wavelength. Specifically, if there is even a slight overlapping between adjacent pulses (optical solitons), a displacement of the frequency components of the optical pulses is generated by this overlapped component. Furthermore, as a result of this frequency modulation, the propagation rate of the pulses varies; consequently, a time shift of the optical pulses is generated. Because of this time shift, the positional relationship between adjacent optical pulses is shifted from the initial state. This shift of the positional relationship is time jitter. Time jitter acts in the direction of mutual attraction in cases where the adjacent optical pulses have the same phase. Accordingly, in cases where the propagation distance is extremely long, a collision occurs between the adjacent optical pulses.

Conventionally, such collisions have been prevented by shortening the pulse width $\tau 0$ of the optical solitons so that overlapping of the optical solitons is suppressed as far as possible. The reason for this is that soliton interaction decreases with a decrease in the overlapping of optical solitons. However, as was described above, since soliton interaction is caused by even a slight amount of overlapping between adjacent optical pulses, collisions between adjacent pulses could not be sufficiently prevented using this method.

Especially in cases where regions of large wavelength dispersion are locally present within the optical fibers, the spread of the optical pulses in such regions becomes conspicuous; accordingly, even in cases where the pulse width τ0 is sufficiently small, overlapping between optical pulses occurs so that soliton interaction is increased.

In the present embodiment, on the other hand, the phase difference between adjacent optical pulses is first of all set at π phase. Accordingly, in an optical soliton system with small local wavelength dispersion, time jitter acts in such a direction that the pulses repel each other in cases where frequency modulation occurs as a result of the overlapping of pulses. Specifically, the direction of the time jitter that is generated when soliton interaction occurs is determined in accordance with the initial phase difference between the adjacent pulses. Accordingly, in cases where the local wavelength dispersion within the optical fiber is small, collisions between pulses can be effectively inhibited by setting the initial phase difference between adjacent pulses at π phase.

Furthermore, in cases where regions of large wavelength dispersion are present within the optical fibers, the phase of pulses spreading in such regions varies abruptly. Consequently, the time jitter depends more on the light intensity in the overlapping regions than on the magnitude of the soliton interaction, which depends on the phase. Accordingly, in this case, collisions between pulses cannot be effectively inhibited merely by setting the initial phase difference between pulses at π phase. In the present embodiment, the duty ratio τ0 of the optical pulses is set at 0.5 or greater. In cases where the duty ratio τ0 is 0.5 or greater, overlapping between pulse waveforms is great if the phase difference between adjacent pulses in the initial state is 0, so that soliton interaction is extremely large. However, if the initial phase difference between adjacent pulses is π phase, then the pulses cancel each other in these overlapping regions, so that the light intensity in the overlapping regions is diminished. Specifically, since the present embodiment is devised so that pulses are deliberately overlapped in the initial state, the light intensity in the overlapping regions is reduced. Consequently, in the present embodiment, soliton interaction can be effectively reduced.

The relationship of the duty ratio τ0 and phase difference φ to the propagation characteristics (collision distance) will be described using the simulation results shown in FIGS. 6A, 6B, 7A and 7B.

Figure 6A:
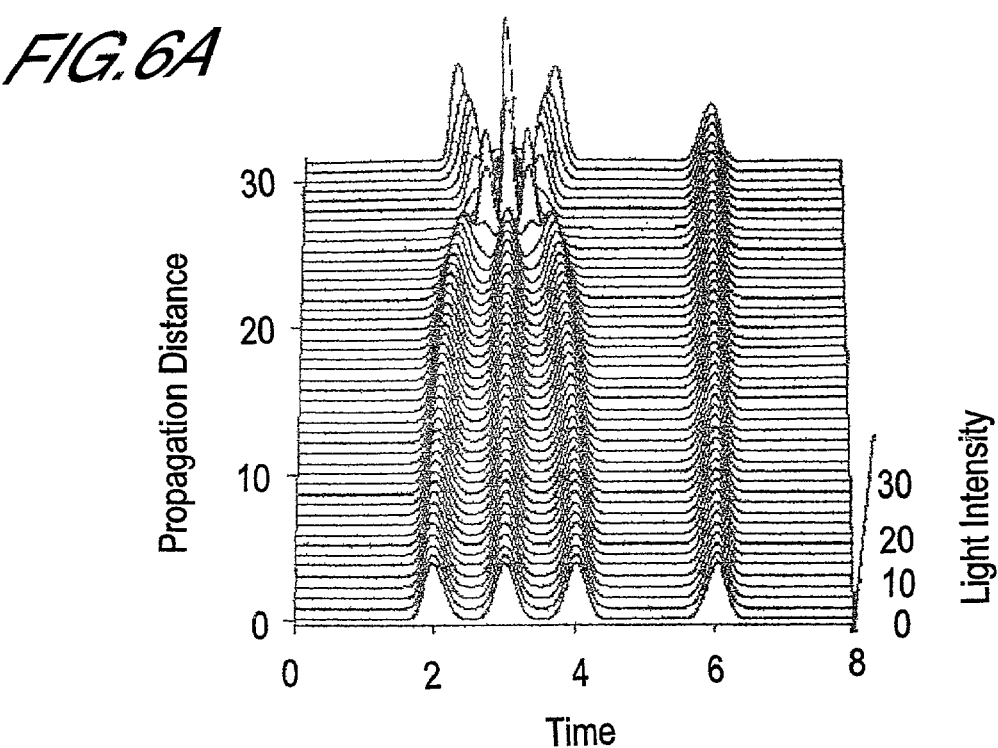
FIGS. 6A and 6B are schematic diagrams which show the results of a simulation of the propagation characteristics of a conventional wavelength-division multiplex system.
Figure 6B:
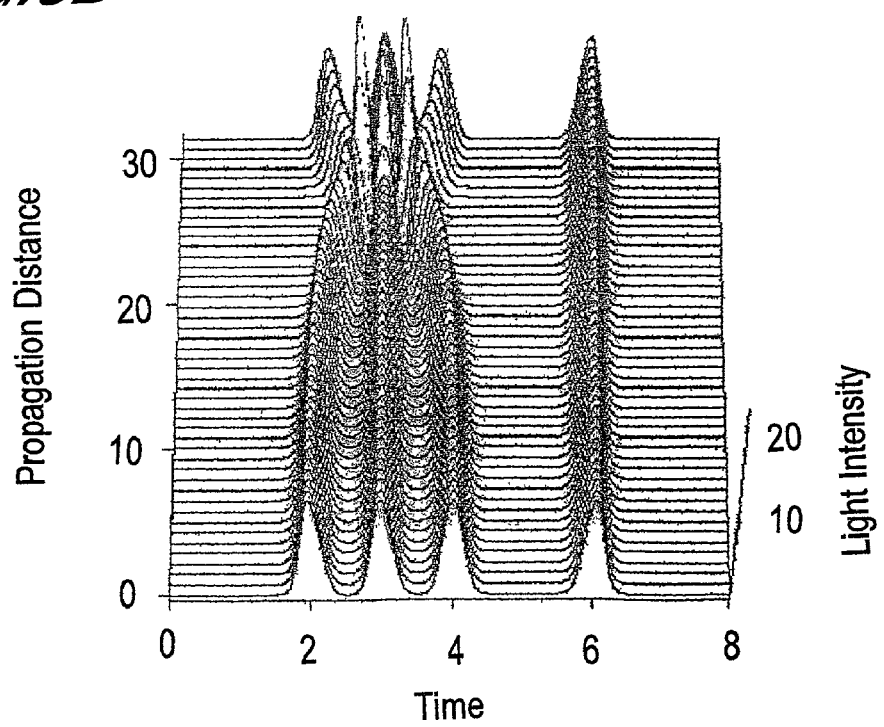
Figure 7A:
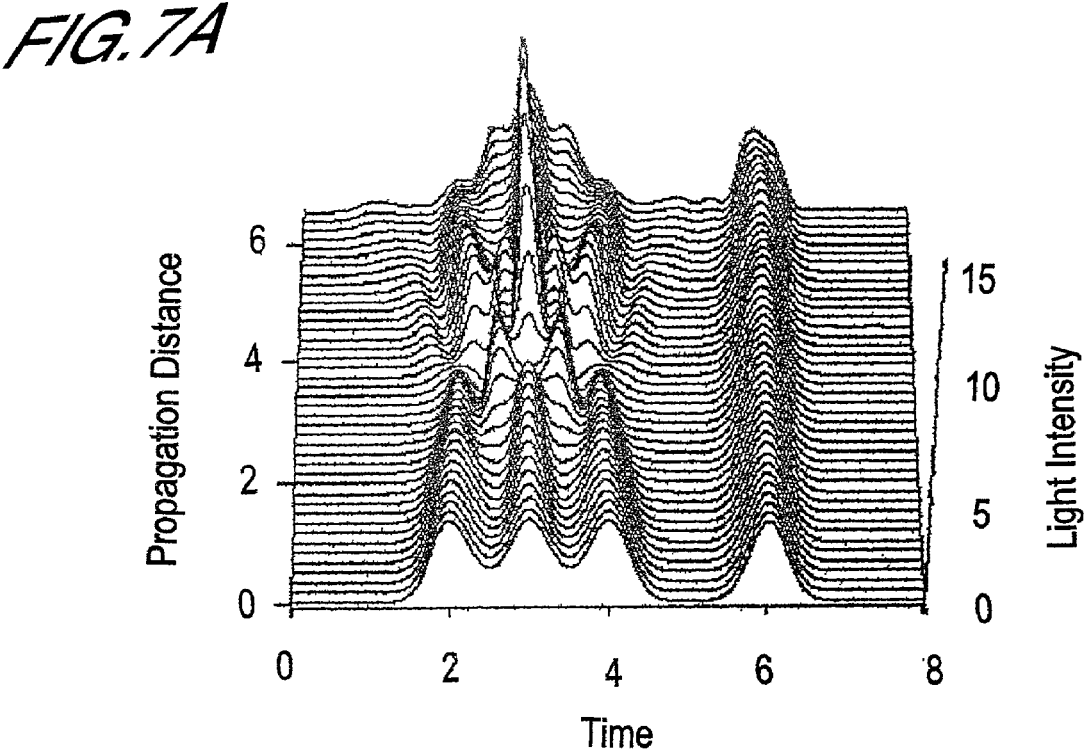
FIGS. 7A and 7B are schematic diagrams which show the results of a simulation of the propagation characteristics of the wavelength-division multiplex system of the embodiment.
Figure 7B:
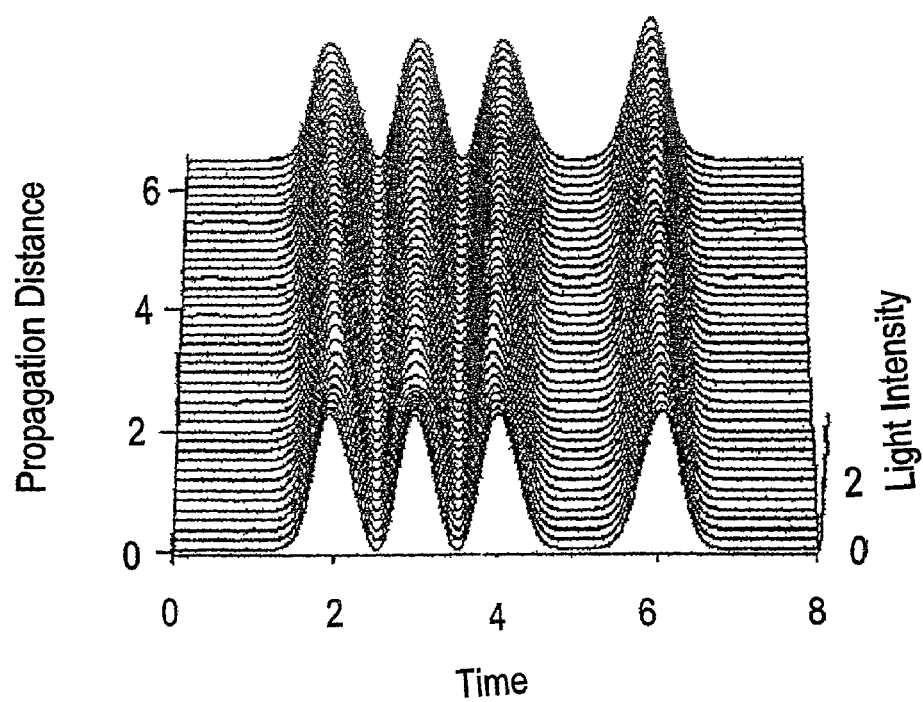

FIGS. 6A and 6B illustrate cases in which the duty ratio τ0 is 0.32. FIG. 6A shows a case in which the phase difference φ between adjacent pulses is the same phase (i. e., φ=0), while FIG. 6B shows a case in which the phase difference between adjacent pulses is π phase (i. e., φ=π). Furthermore, FIGS. 7A and 7B illustrate cases in which the duty ratio τ0 is 0.56. FIG. 7A shows a case in which the phase difference φ between adjacent pulses is the same phase (i. e., φ=0), while FIG. 7B shows a case in which the phase difference between adjacent pulses is π phase (i. e., φ=π). In FIGS. 6A, 6B, 7A and 7B, the parameter γ is 3.3. Furthermore, in these respective figures, the vertical axis indicates the propagation distance normalized by the dispersion distance, the horizontal axis indicates time normalized by the initial pulse interval, and the axis in the direction of height indicates the light intensity (in arbitrary units). Here, the dispersion distance Ld is a quantity defined as $Ld=(T0)^2/Bave$ in a case assuming Gauss-type pulses. Furthermore, T0 is the pulse width (width between positions where the light intensity is 1/e of the peak value), and Bave is the average frequency dispersion.

In FIGS. 6 and 7, the propagation distance is normalized by the dispersion distance; accordingly the coordinates of the propagation distance differ. A propagation distance of "20" in FIGS. 6A and 6B corresponds to a propagation distance of "6.5" in FIGS. 7A and 7B. In a case where there is no such normalization, the propagation distances shown in FIGS. 6A and 6B and the propagation distances shown in FIGS. 7A and 7B are more or less the same.

As is seen from FIGS. 6A and 6B, in a cases where τ0=0.32, no overlapping between adjacent pulses occurs in the initial state. Furthermore, as is shown in FIG. 6A, in a case where τ0=0.32 and φ=0, adjacent pulses collide while the pulses are being propagated (the propagation distance is in the vicinity of a normalized value of "27"). Furthermore, as is shown in FIG. 6B, adjacent pulses also collide at approximately the same propagation distance in a case where τ0=0.32 and φ=π. Specifically, it is seen from FIGS. 6A and 6B that in a case where τ0=0.32, collisions are almost not suppressed even if the phase difference φ is varied. As was described above, the reason for this is that collisions between adjacent pulses depend more on the light intensity in the overlapping regions than on the magnitude of soliton interaction.

Meanwhile, as is seen from FIG. 7A, an overlap between adjacent pulses is formed in the initial state in a case where τ0=0.56 and φ=0. In this case, furthermore, adjacent pulses collide with each other while the pulses are being propagated (the propagation distance is in the vicinity of a normalized value of "2.5"). On the other hand, as is shown in FIG. 7B, the overlapping between adjacent pulses cancels out in the initial state in a case where τ0=0.56 and φ=π. In this case, then, the pulses show almost no time jitter, and there are no collisions between adjacent pulses. Specifically, it is seen from FIGS. 7A and 7B that collisions can be suppressed by setting the phase difference φ at π in a case where τ0=0.56.

In a case where the transmission rate is 40 Gbits/s and the average dispersion of the transmission path is 0.04 ps/nm/km, the pulse width of the optical pulses corresponding to FIG. 7B is 14 picoseconds, and the propagation distance of "6.5' in FIG. 7B is approximately 9,000 kilometers.

Next, the relationship between the propagation distance (collision distance) and the parameter γ will be described with reference to the graph in FIG. 8.

Figure 8:
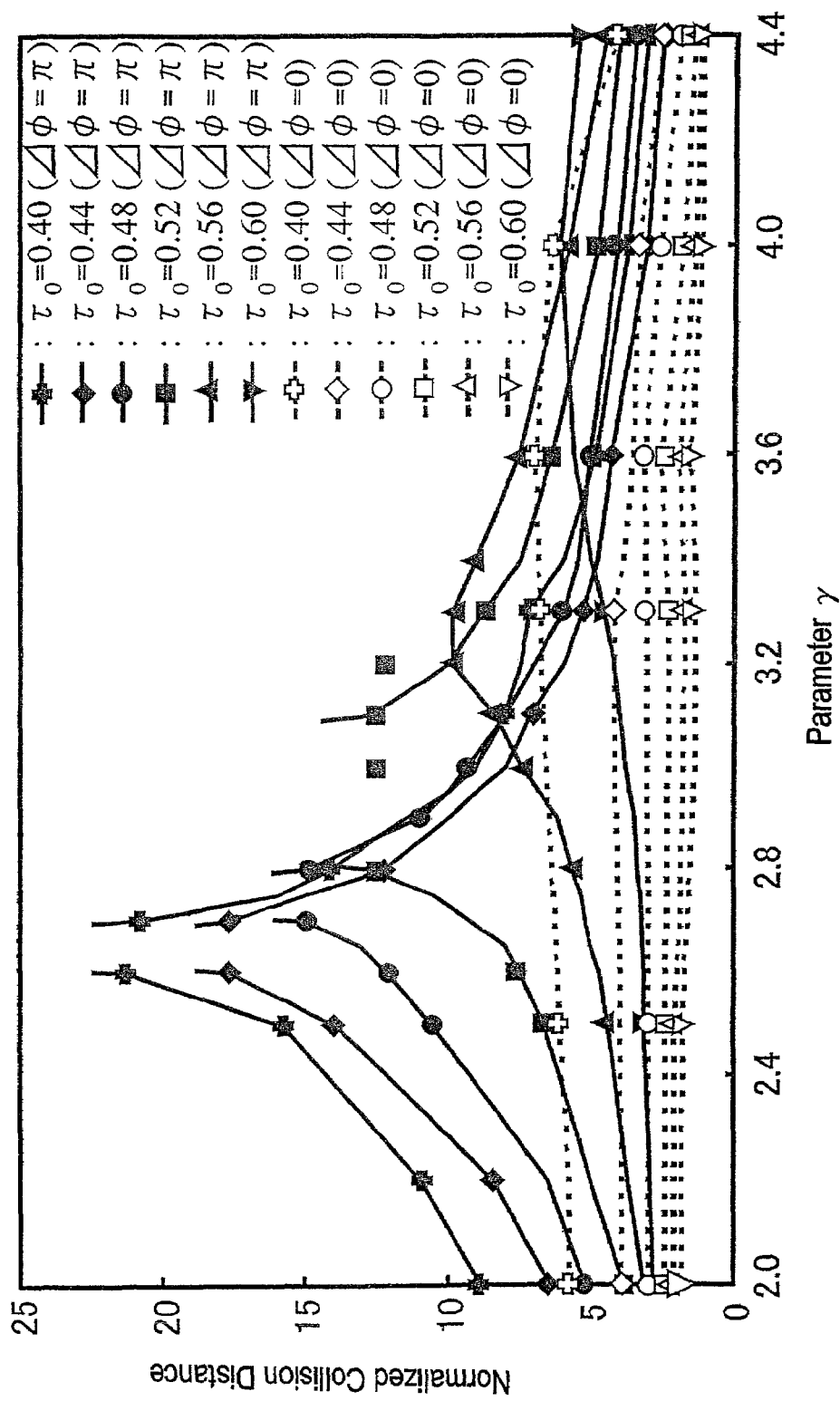
FIG. 8 is a schematic diagram which shows the results of a simulation of the propagation characteristics of the wavelength-division multiplex system of the embodiment.

As is seen from FIG. 8, the collision distance increases with an increase in the parameter γ of dispersion management in cases where the duty ratio τ0 is 0.5 or greater. As described above, when the duty ratio τ0 is increased, the intensity of the light that is cancelled by setting the phase difference at π increases; as a result, the effect that causes adjacent pulses to repel each other is enhanced. Accordingly, in order to cancel out this repulsion effect, it is desirable to use optical fibers that have a large parameter γ as the optical fibers 131-1, 131-2, . . . of the optical communications line 130 (see FIG. 1).

In the system of the present embodiment, as is shown in FIG. 1, the optical signal sequences of the respective channels (optical data sequences in which the duty ratio τ0 is 0.5 or greater and the phase difference between adjacent optical pulses is π phase) are transmitted after being subjected to wavelength-division multiplexing. The improvement of the propagation characteristics (suppression of soliton interaction and the like) within a single channel is achieved as described above. In addition, in the present embodiment, interaction between channels is suppressed as described below.

As was described above, in the case of dispersion-managed soliton transmission subjected to fine wavelength-division multiplexing, nonlinear interaction between channels, i. e., cross phase modulation (XPM) appears to a conspicuous degree. This cross phase modulation becomes more conspicuous with a decrease in the ratio $\Delta\omega/\omega 0$ of the frequency interval $\Delta\omega$ of adjacent channels to the width $\omega 0$ of the frequency spectrum of the optical signals. Accordingly, it is desirable to minimize the width $\omega 0$ of the frequency spectrum in order to improve the propagation characteristics. However, if the width $\omega 0$ of the frequency spectrum is reduced, the pulse width $\tau 0$ of the optical pulses increases. In a conventional technique, as was described above, the soliton interaction increases if the pulse width $\tau 0$ of the optical pulses is increased; accordingly, the propagation characteristics within a single channel deteriorate. For this reason, the width $\omega 0$ of the frequency spectrum could not be sufficiently reduced in conventional techniques.

In the case of the wavelength-division multiplex transmission system of the present embodiment, on the other hand, the soliton interaction is small in spite of the fact that the pulse width $\tau 0$ (duty ratio) of the optical pulses is large (0.5 or greater). Accordingly, both soliton interaction and interaction between channels can be reduced.

Figure 9:
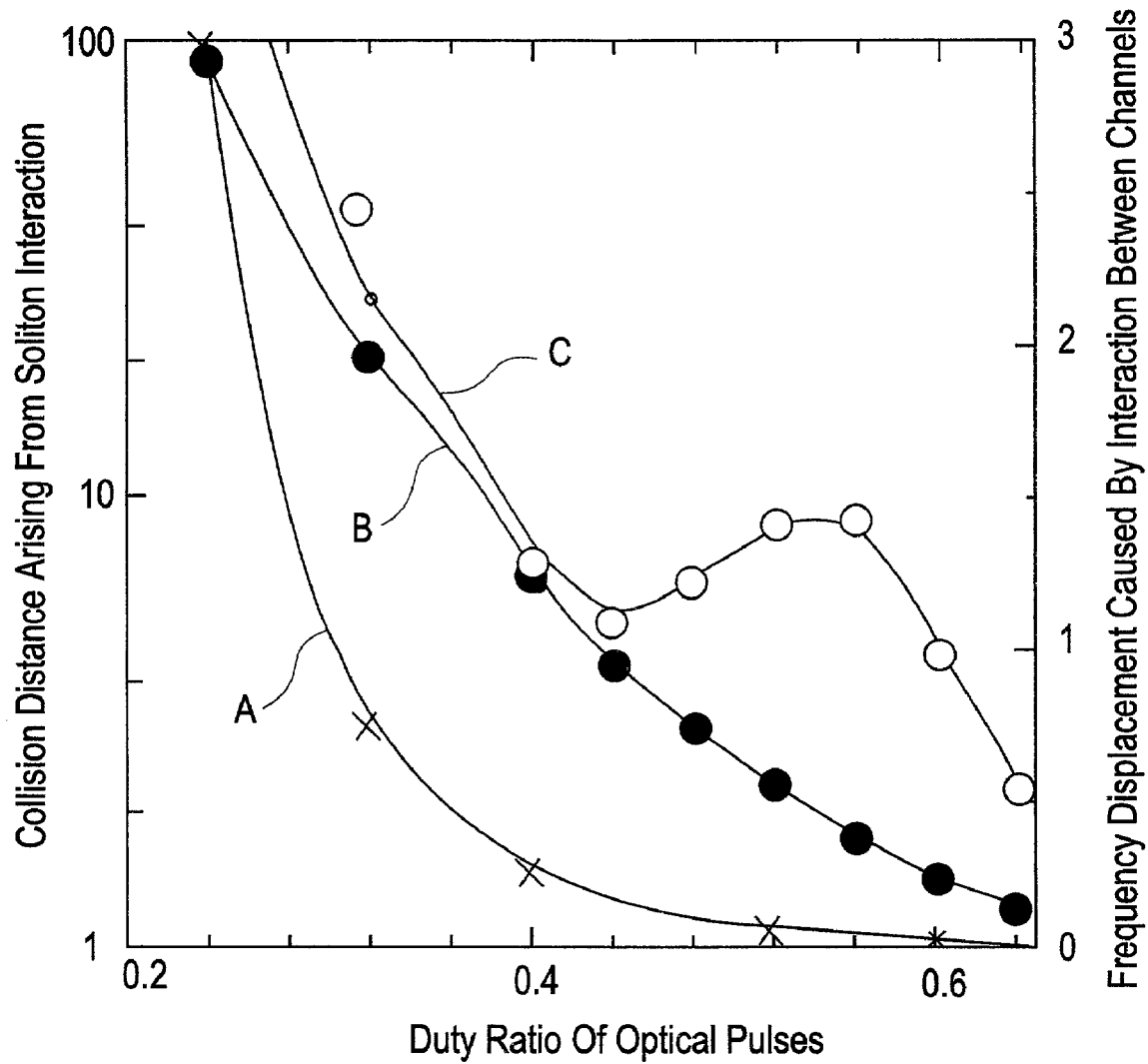
FIG. 9 is a schematic diagram which shows the results of a simulation of the propagation characteristics of the wavelength-division multiplex system of the embodiment.

FIG. 9 is a graph which shows the relationship of soliton interaction and interaction between channels to the duty ratio $\tau 0$. In FIG. 9, the vertical axes indicate the collision distance arising from soliton interaction and the amount of frequency displacement caused by interaction between channels, and the horizontal axis indicates the duty ratio $\tau 0$.

In FIG. 9, curve A indicates the relationship between the amount of frequency displacement caused by interaction between channels and the duty ratio $\tau 0$. Curve B indicates the relationship between the collision distance arising from soliton interaction and the duty ratio $\tau 0$ in a case where the phase difference $\phi$ of the optical signal sequences of the respective channels is 0 (i. e., a conventional case). Furthermore, curve C indicates the relationship between the collision distance arising from soliton interaction and the duty ratio $\tau 0$ in a case where the phase difference $\phi$ of the optical signal sequences of the respective channels is $\pi$ (i. e., the case of the present embodiment).

As is seen from curve A, the amount of frequency displacement caused by interaction between channels decreases with an increase in the duty ratio $\tau 0$. Accordingly, it is desirable to maximize the duty ratio $\tau 0$ in order to suppress interaction between channels.

Furthermore, as is seen from curve B, the collision distance decreases with an increase in the duty ratio $\tau 0$ in a case where the phase difference $\phi$ is 0.

On the other hand, as is seen from curve C, the collision distance can be lengthened when the duty ratio $\tau 0$ is large in a case where the phase difference $\phi$ is $\pi$.

It is seen from the above that in the wavelength-division multiplex transmission system of the present embodiment, dispersion-managed soliton transmission in which both soliton interaction and interaction between channels are small can be realized.

Figure 10:
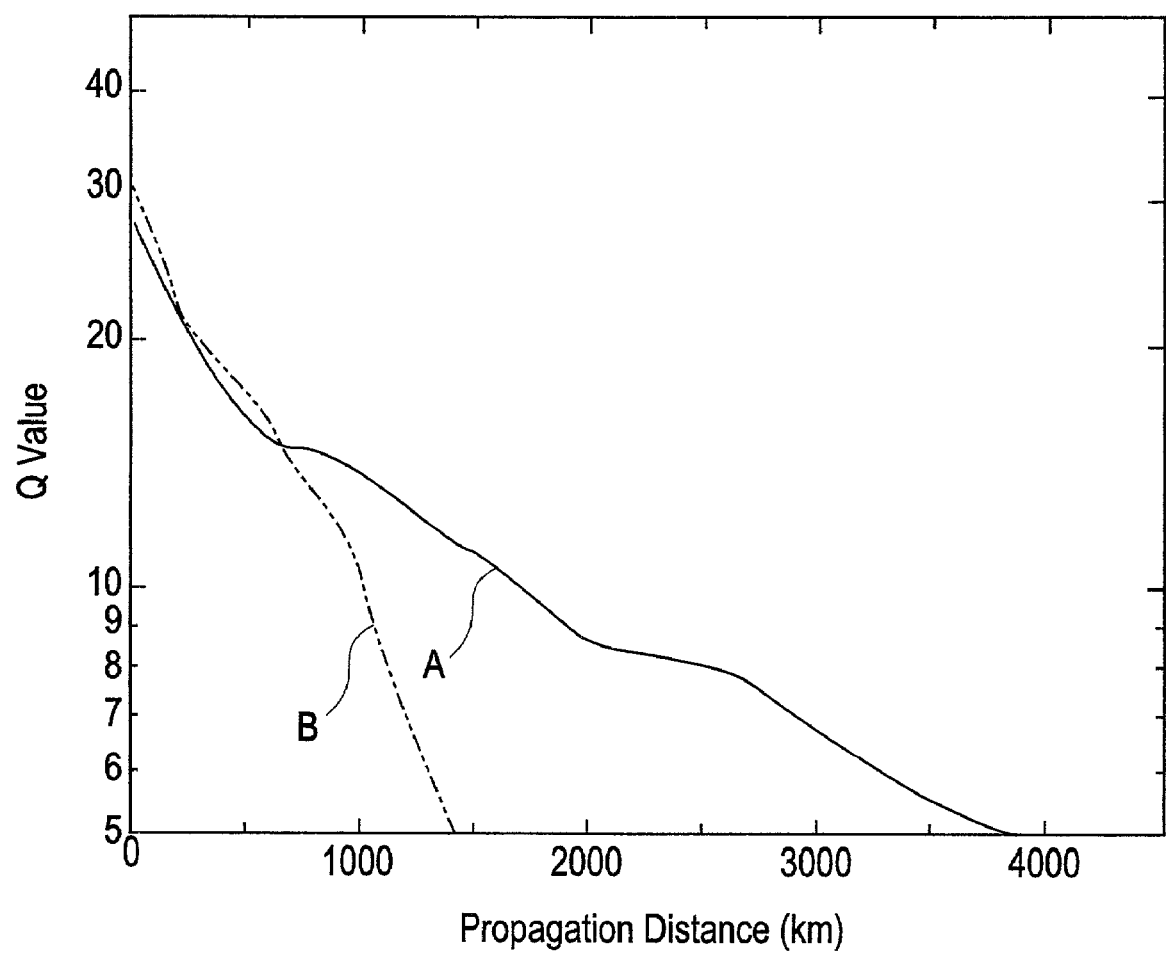
FIG. 10 is a schematic diagram which shows the results of a simulation of the propagation characteristics of the wavelength-division multiplex system of the embodiment.

FIG. 10 is a graph which shows the relationship between the propagation distance and the Q value. Here, the "Q value" is a concept that corresponds to the code error rate; a high Q value indicates a high signal reliability. In FIG. 10, curve A indicates the case of the wavelength-division multiplex transmission system of the present embodiment; here, the pulse width of the optical data sequences of the respective channels was set at 14 picoseconds. Furthermore, curve B indicates the case of a convention wavelength-division multiplex transmission system (with a duty ratio of less than 0.5 and a phase difference of 0); here, the pulse width of the optical data sequences of the respective channels was set at 8 picoseconds.

As is seen from FIG. 10, the system of the present embodiment makes it possible to achieve a great increase in the reliability of the transmitted data compared to a conventional system, so that the distance over which transmission is possible can be lengthened.

In the wavelength-division multiplex system of the present embodiment, as was described above, optical data sequences in which the duty ratio of the optical pulses is 0.5 or greater and the phase difference between adjacent optical pulses is $\pi$ phase are used as the optical data sequences that are subjected to wavelength-division multiplexing. Consequently, soliton interaction in the optical data sequences and interaction between channels can be reduced, so that the reliability of the transmitted data can be increased.

In the present embodiment, a case was described in which the multiplexing device of the present invention was applied to a dispersion-managed soliton transmission type transmission system. However, the present invention can also be applied to linear transmission type transmission systems. In the case of linear transmission, unlike the case of soliton transmission which utilizes nonlinear effects, the pulse waveform is degraded by residual dispersion within the transmission path. Causes of this dispersion include linear effects and nonlinear effects within the fiber arising from self phase modulation (SPM). Degradation caused by linear effects can be compensated for by eliminating the accumulated dispersion immediately prior to reception. On the other hand, in cases where there are nonlinear effects within the optical fibers, the waveform distortion cannot be returned to a distortion-free state. Accordingly, in cases where such nonlinear effects are large, the code error rate increases, so that the distance over which transmission is possible is shortened. This degradation caused by nonlinear effects is roughly comparable to soliton interaction within the same channel as described above. Accordingly, the reliability of the transmitted data can be improved in cases where the multiplexing device of the present invention is applied to linear transmission systems as well, so that the distance over which transmission is possible can be lengthened.

Furthermore, as is clear from the above description, in cases where the transmitters 110-1 through 110-N of the present embodiment are applied to a single-channel transmission system (i. e., a transmission system in which wavelength-division multiplexing is not performed) as well, the reliability of the transmitted data can be improved compared to that in a conventional single-channel transmission system; accordingly, the distance over which transmission is possible can be lengthened.

In the present invention, as was described above in detail, the reliability of the transmitted data can be improved, so that a multiplexing device in which the distance over which transmission is possible is long can be provided.

What is claimed is:

1. An optical communications system comprising:
    a transmitter including:
        a plurality of time-division multiplexing devices each having mutually different frequencies, each of said plurality of transmitting time-division multiplexing devices time-division multiplexing a first optical signal sequence and a second optical signal sequence having a $\pi$ phase difference therebetween to generate an optical data sequence, a duty ratio of said first optical signal sequence and of said second optical signal sequence being from 0.52 to less than 0.56; and an optical multiplexer, said optical multiplexer wavelength division multiplexing said optical data sequence from each of said plurality of time-division multiplexing devices;

an optical communications line that propagates said wavelength multiplexed optical data sequence, in which a dispersion management parameter of the optical communications line is from 2.6 to less than 3.3; and a receiver including:

an optical demultiplexer that separates said wavelength multiplexed optical data sequence received from said optical communications line by wavelength into a plurality of time-division multiplexed optical data sequences; and a plurality of time-division demultiplexers that separate said plurality of received time-division multiplexed optical data sequences received from said optical demultiplexer by time.

2. The optical communications system according to claim 1, wherein each of said time-division multiplexing devices comprises:

an optical modulator which generates an optical short pulse sequence consisting of optical pulses with a duty ratio greater than 0.5 to less than 0.56 from continuous light;

an optical branching circuit which splits said optical short pulse sequence input from said optical modulator into a first optical short pulse sequence and a second optical short pulse sequence;

a first data modulator which generates said first optical signal sequence by encoding said first optical short pulse sequence;

a second data modulator which generates said second optical signal sequence by encoding said second optical short pulse sequence;

a phase control device which controls at least either the phase of said first optical signal sequence or the phase of said second optical signal sequence, so that the phase difference between said first optical signal sequence and said second optical signal sequence is $\pi$ phase; and an optical multiplexer which generates said optical data sequence by multiplexing said first optical signal sequence and said second optical signal sequence.

3. The optical communications system according to claim 2, wherein said optical modulator generates said optical short pulse sequence consisting of optical solitons by gauss-modulating of said continuous light.

4. The optical communications system according to claim 2, wherein each of said time-division multiplexing devices further comprises a delay device which is used to adjust the waveform of said first optical signal sequence or said second optical signal sequence.

5. The optical communications system according to claim 4, wherein the phase of either said first optical signal sequence or said second optical signal sequence is controlled by said phase control device, and the waveform of the other of said first and second optical signal sequences is adjusted by said delay device.

6. The optical communications system according to claim 1, wherein said optical communications line is constructed by alternately connecting a plurality of optical fibers and a plurality of optical amplifiers.

7. The optical communications system according to claim 6, wherein said optical fibers constitute a dispersion-managed soliton transmission path.

8. The optical communications system according to claim 7, wherein said dispersion-managed soliton transmission path is constructed by alternately connecting an anomalous-dispersion fiber and a normal-dispersion fiber.

9. The optical communications system according to claim 1, wherein said optical communications line is a linear transmission path.

* * * * *